(12) United States Patent
Koito et al.

(10) Patent No.: US 10,823,886 B2
(45) Date of Patent: Nov. 3, 2020

(54) DISPLAY DEVICE

(71) Applicant: Japan Display Inc., Minato-ku (JP)

(72) Inventors: Takeo Koito, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 267 days.

(21) Appl. No.: 15/900,991

(22) Filed: Feb. 21, 2018

(65) Prior Publication Data

US 2018/0239068 A1 Aug. 23, 2018

(30) Foreign Application Priority Data

Feb. 22, 2017 (JP) .................................. 2017-031168

(51) Int. Cl.
| | |
|---|---|
| *G02B 5/30* | (2006.01) |
| *G02B 27/28* | (2006.01) |
| *G02B 5/124* | (2006.01) |
| *G02B 5/13* | (2006.01) |
| *G02B 30/56* | (2020.01) |
| *G02F 1/1362* | (2006.01) |
| *G09G 3/36* | (2006.01) |
| *G02F 1/1368* | (2006.01) |

(52) U.S. Cl.
CPC .............. *G02B 5/124* (2013.01); *G02B 5/13* (2013.01); *G02B 5/3025* (2013.01); *G02B 5/3083* (2013.01); *G02B 30/56* (2020.01); *G02F 1/1368* (2013.01); *G02F 1/136286* (2013.01); *G02F 2201/121* (2013.01); *G02F 2201/123* (2013.01); *G09G 3/3648* (2013.01)

(58) Field of Classification Search
CPC ....................................................... G02B 1/04
USPC ......................................... 359/485.01–485.07
See application file for complete search history.

(56) References Cited

U.S. PATENT DOCUMENTS

| | | | |
|---|---|---|---|
| 10,386,671 B2* | 8/2019 | Koito ................ | G02F 1/133526 |
| 2013/0044270 A1* | 2/2013 | Koito .................... | G02F 1/1339 349/58 |
| 2013/0083089 A1* | 4/2013 | Koito ................... | H04N 13/312 345/690 |
| 2013/0148044 A1* | 6/2013 | Ohyama ............ | G02B 27/2214 349/15 |
| 2013/0222753 A1* | 8/2013 | Koito .................... | G02F 1/1339 349/153 |
| 2013/0229587 A1* | 9/2013 | Takama ............. | G02B 27/2214 349/33 |

(Continued)

FOREIGN PATENT DOCUMENTS

JP 2011-253128 12/2011

*Primary Examiner* — William R Alexander
*Assistant Examiner* — Tamara Y. Washington
(74) *Attorney, Agent, or Firm* — Oblon, McClelland, Maier & Neustadt, L.L.P.

(57) ABSTRACT

According to one embodiment, a display device including a display unit which emits display light, an optical element which includes a first surface on the display unit side, and a second surface on a side opposite to the first surface, and transmits and reflects incident light, and a retroreflective element provided on the first surface side or the second surface side, wherein the retroreflective element includes first and second retroreflectors which retroreflect light made incident through the optical element, and a transmissive portion located between the first retroreflector and the second retroreflector.

19 Claims, 10 Drawing Sheets

(56) References Cited

U.S. PATENT DOCUMENTS

| | | | |
|---|---|---|---|
| 2013/0229600 A1* | 9/2013 | Takama | G02B 27/2214 349/77 |
| 2013/0235305 A1* | 9/2013 | Takama | G02F 1/133528 349/96 |
| 2014/0168547 A1* | 6/2014 | Takama | G02B 3/005 349/15 |
| 2014/0211112 A1* | 7/2014 | Yang | G02B 27/2214 349/15 |
| 2014/0267993 A1* | 9/2014 | Sugiyama | G02F 1/1337 349/128 |
| 2017/0230642 A1* | 8/2017 | Suzuki | H04N 13/373 |
| 2018/0299730 A1* | 10/2018 | Saito | G02B 5/20 |

\* cited by examiner

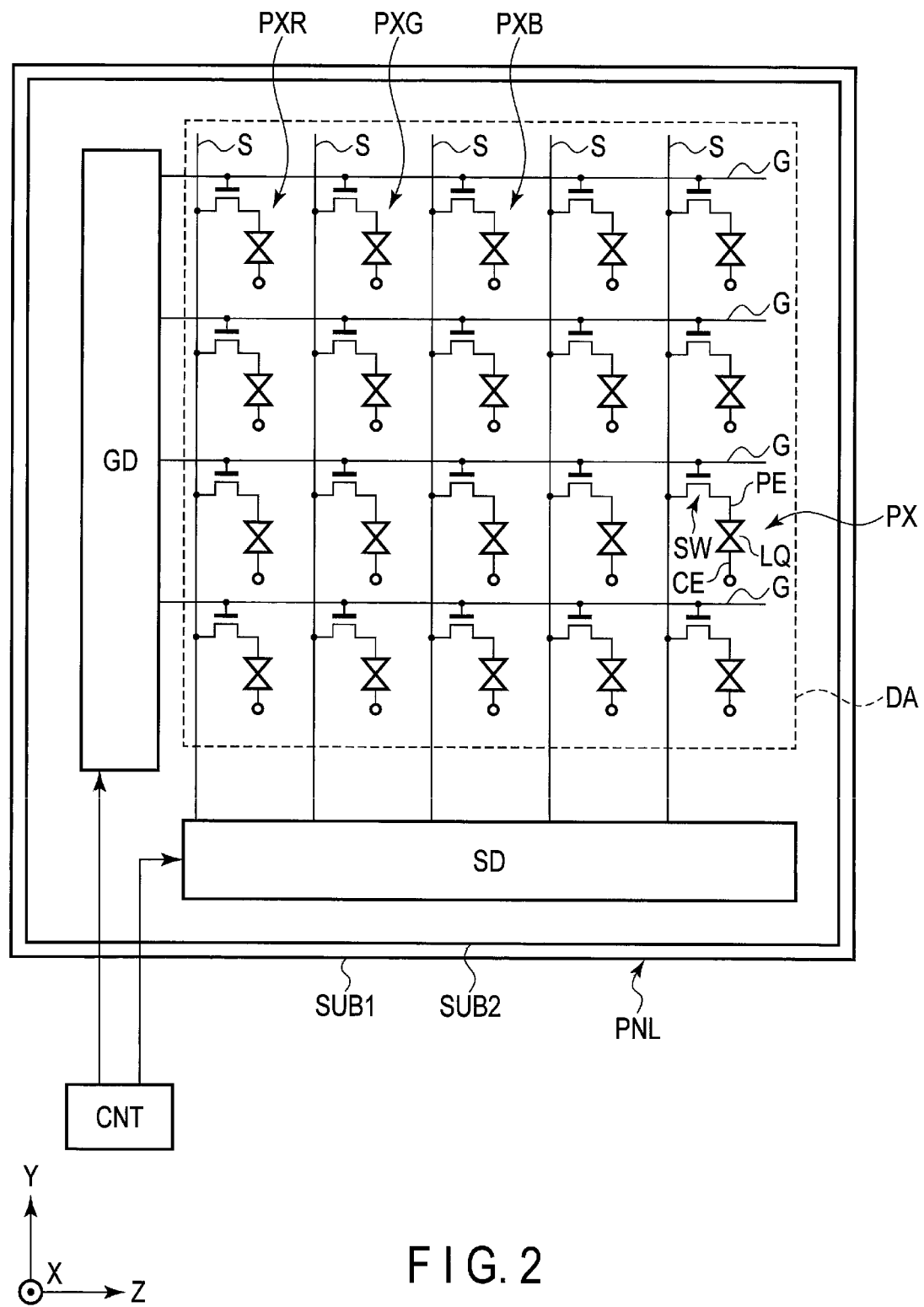
F I G. 2

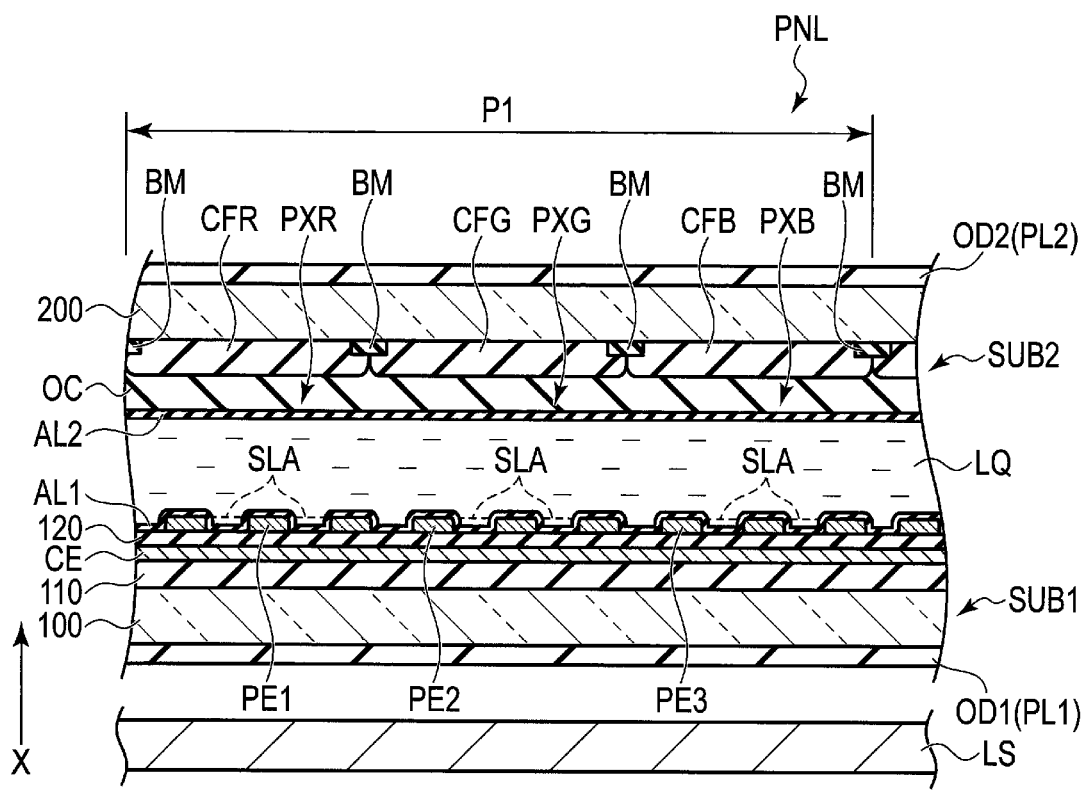
F I G. 3

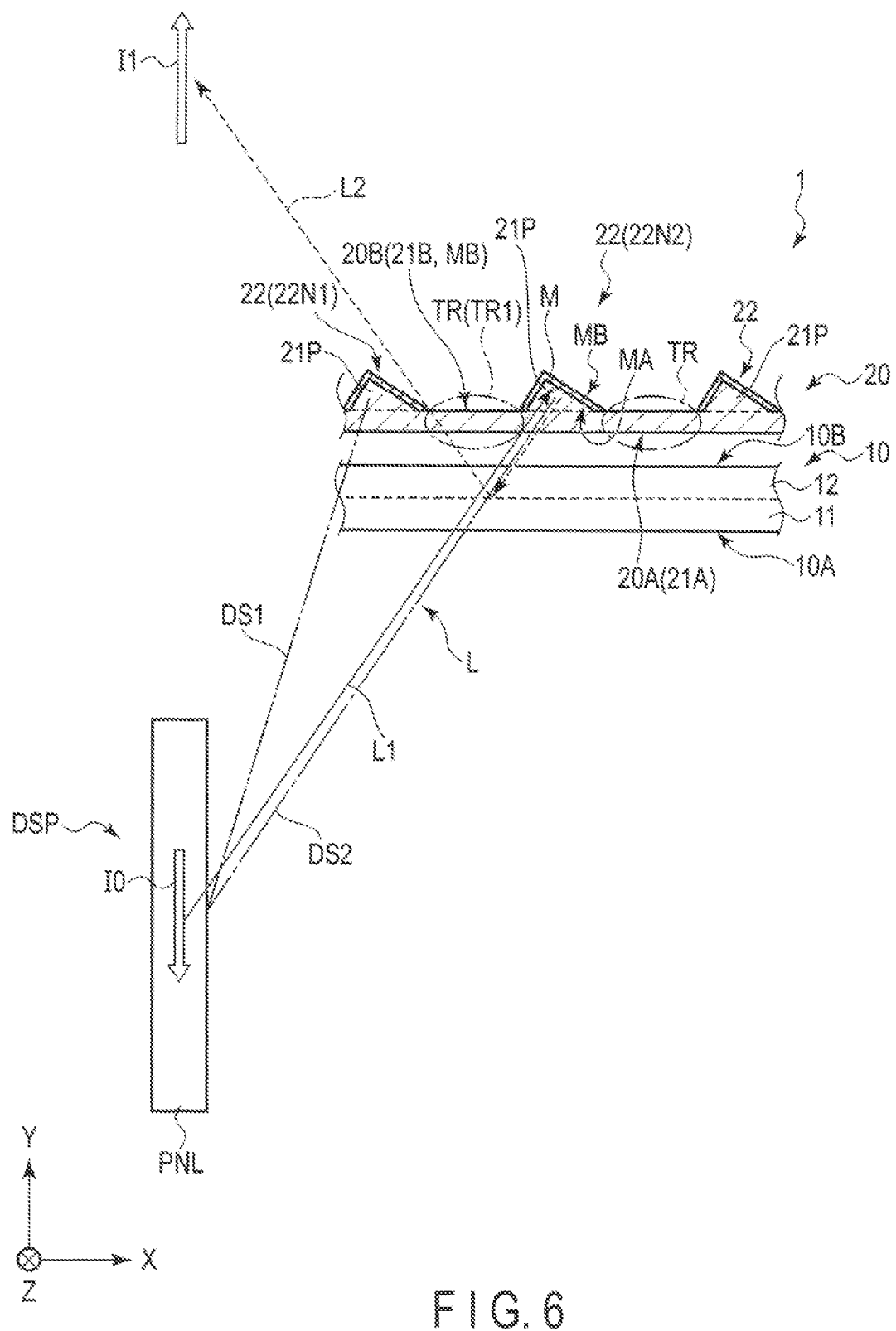
F I G. 6

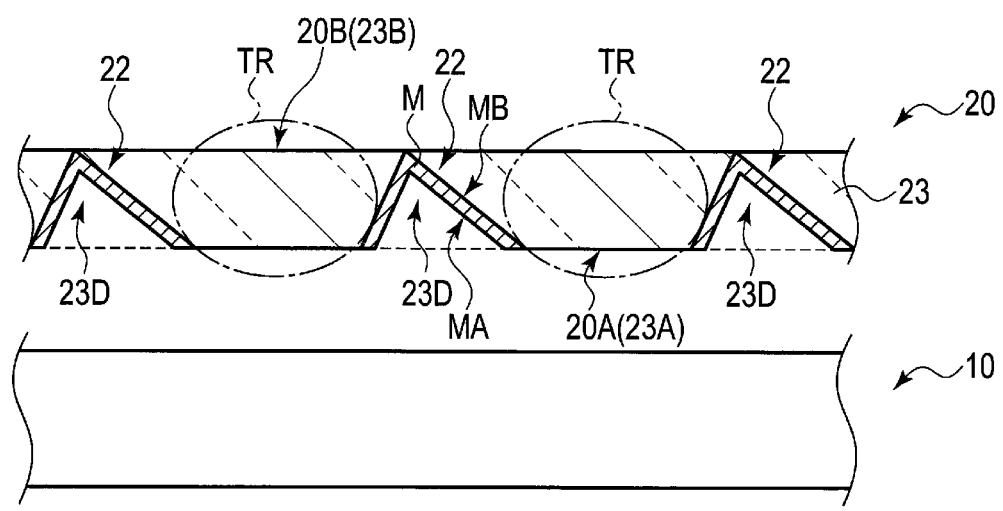
F I G. 7
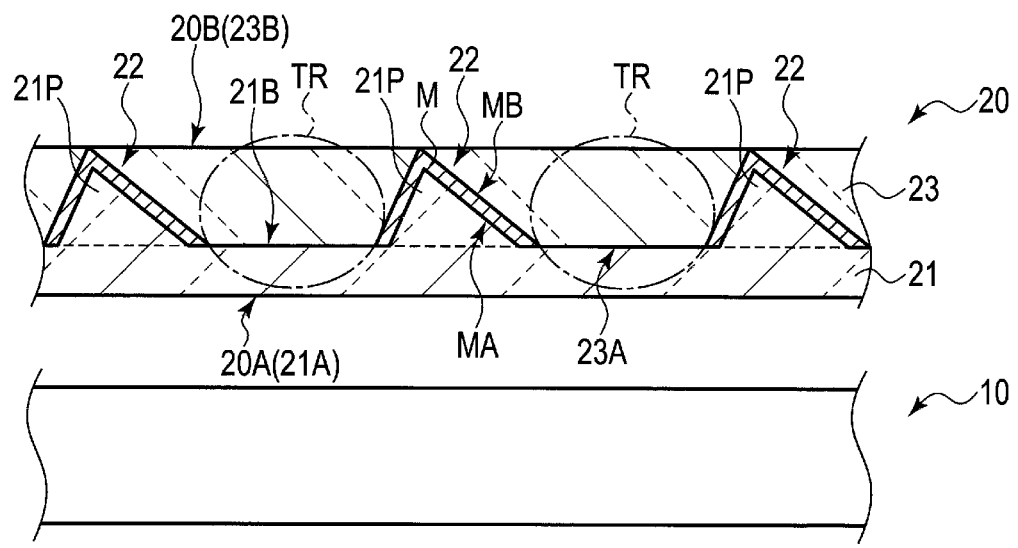
F I G. 8

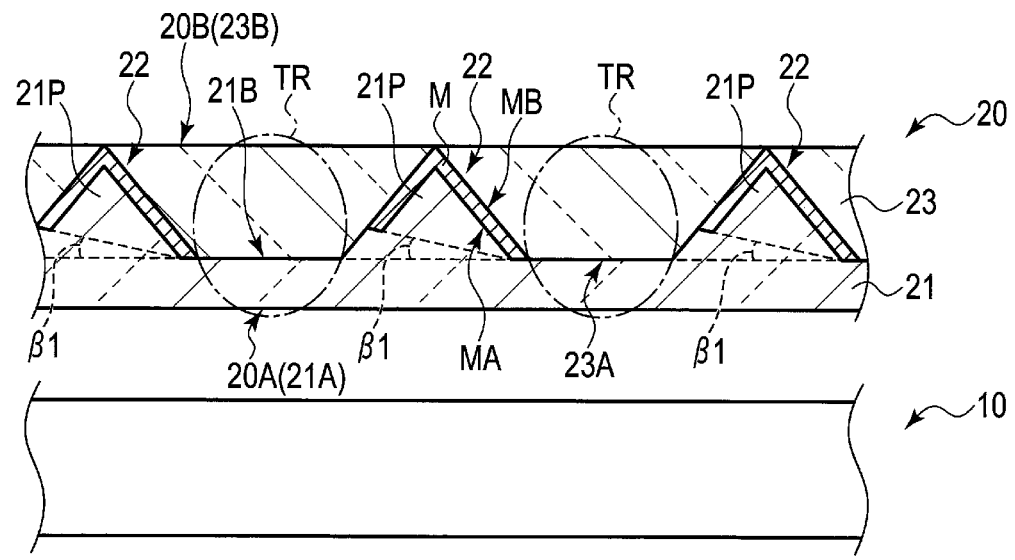
F I G. 9
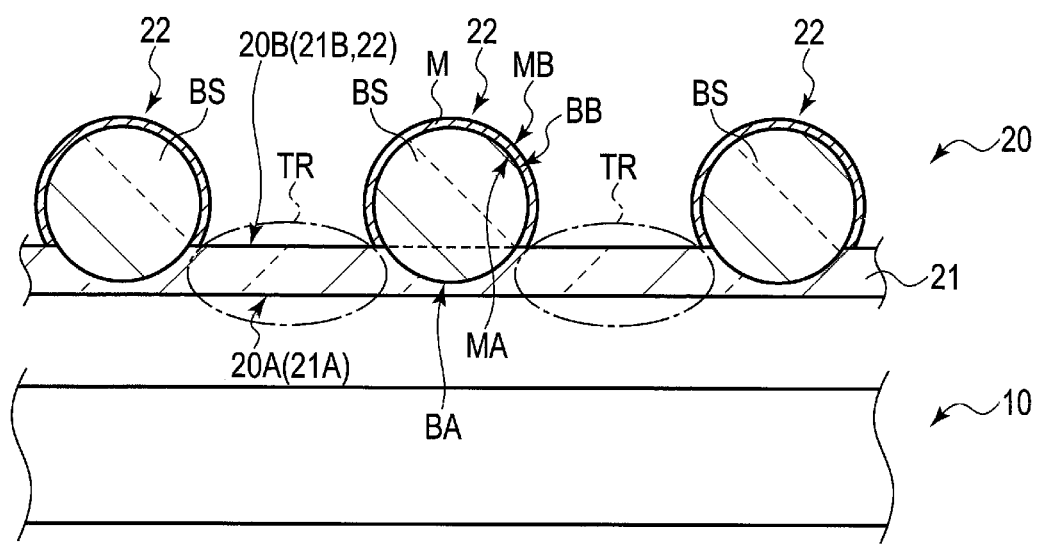
F I G. 10

DISPLAY DEVICE

CROSS-REFERENCE TO RELATED APPLICATIONS

This application is based upon and claims the benefit of priority from Japanese Patent Application No. 2017-031168, filed Feb. 22, 2017, the entire contents of which are incorporated herein by reference.

FIELD

Embodiments described herein relate generally to a display device.

BACKGROUND

Display devices which form a display image in air have been suggested. For example, a display device comprises a display unit which emits display light, an optical element which transmits and reflects display light, and a retroreflective element which retroreflects display light. In this display device, the retroreflective property of the retroreflective element may affect the resolution of the display image formed in air. The retroreflective property is indicated by, for example, the angle between the optical path of the light made incident on the retroreflective element and the optical path of retroreflective light.

BRIEF DESCRIPTION OF THE DRAWINGS

FIG. 2 shows a structural example of the display panel shown in FIG. 1.

FIG. 3 is a cross-sectional view showing a structural example of the display panel shown in FIG. 2.

FIG. 6 shows a structural example of the display device according to modification example 1, and the optical path of display light.

FIG. 7 shows a structural example of the display device according to modification example 2.

FIG. 8 shows a structural example of the display device according to modification example 3.

FIG. 9 shows a structural example of the display device according to modification example 4.

FIG. 10 shows a structural example of the display device according to modification example 5.

DETAILED DESCRIPTION

Figure 1:
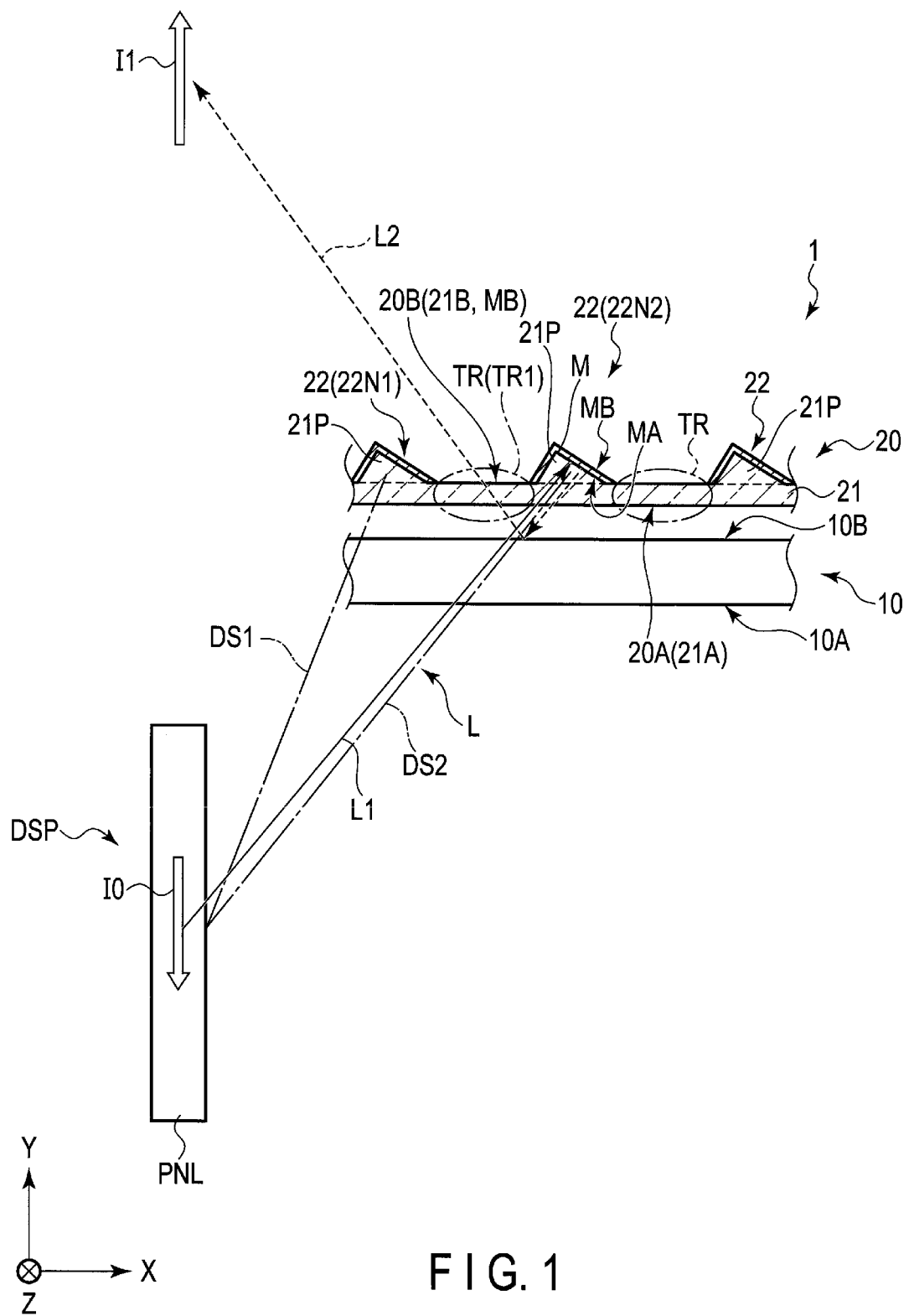
FIG. 1 shows a structural example of a display device according to a first embodiment, and the optical path of display light.

In general, according to one embodiment, a display device comprises: a display unit which emits display light; an optical element which comprises a first surface on the display unit side, and a second surface on a side opposite to the first surface, and transmits and reflects incident light; and a retroreflective element provided on the first surface side or the second surface side, wherein the retroreflective element comprises first and second retroreflectors which retroreflect light made incident through the optical element, and a transmissive portion located between the first retroreflector and the second retroreflector.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 shows a structural example of a display device 1 according to a first embodiment, and the optical path of display light.

The display device 1 comprises a display unit DSP, an optical element 10, a retroreflective element 20, etc. The display unit DSP faces the optical element 10 in a first direction X. The optical element 10 faces the retroreflective element 20 in a second direction Y. The optical element 10 is preferably close to the retroreflective element 20. For example, the optical element 10 is closer to the retroreflective element 20 than the display unit DSP. In the example shown in FIG. 1, the display unit DPS is provided along the normal of the optical element 10. The retroreflective element 20 is provided substantially parallel to the optical element 10. In the example shown in FIG. 1, the retroreflective element 20 extends in the first direction X in which the optical element 10 extends. The second direction Y intersects the first direction X. In the example shown in FIG. 1, the second direction Y is perpendicular to the first direction X. However, the first direction X and the second direction Y may intersect each other at an angle other than 90 degrees. A third direction Z intersects the first direction X and the second direction Y. In the example shown in FIG. 1, the third direction Z is perpendicular to the first direction X and the second direction Y. However, the third direction Z may intersect the first direction X and the second direction Y at an angle other than 90 degrees. In the example shown in FIG. 1, the display unit DSP is provided substantially parallel to the Y-Z plane defined by the second direction Y and the third direction Z. However, the display unit DSP is not limited to this example. In the example shown in FIG. 1, the optical element 10 and the retroreflective element 20 are provided substantially parallel to the Z-X plane defined by the third direction Z and the first direction X. However, the layout is not limited to this example. The display unit DSP may be provided at an angle with the normal of the optical element 10 or may be provided such that the angle with, for example, the optical element 10, is an acute angle. The retroreflective element 20 may be provided at an angle with the optical element 10. An air layer, other members or other layers may be provided between the optical element 10 and the retroreflective element 20. The optical element 10 may be in contact with the retroreflective element 20.

The structure of the display unit DSP is not particularly limited as long as it emits display light. In the example shown in FIG. 1, the display unit DSP comprises a display panel PNL. For example, the display panel PNL is a liquid crystal display panel which holds a liquid crystal layer between a pair of substrates. The liquid crystal display panel may be a transmissive panel which displays an image by selectively transmitting the light emitted from a light source device, a reflective panel which displays an image by selectively reflecting external light or the light emitted from a light source device, or a transflective panel which comprises both the transmissive display function and the reflective display function. It should be noted that, for example, the display panel PNL may be a self-luminous display panel comprising an organic electroluminescent element (OLED), etc., an electronic-paper display panel comprising an electrophoretic element, etc., a display panel to which microelectromechanical systems (MEMS) are applied, or a display panel to which electrochromism is applied.

The display unit DSP is not limited to the structure comprising the display panel. The display unit DSP may comprise a screen on which the light emitted from a projector is projected or may comprise a display medium (for example, a poster) lighted by an illumination device.

The display panel PNL emits display light for display image I0. The display light is, for example, linearly polarized light immediately after the display light is emitted from the display panel PNL. For the sake of convenience, FIG. 1 shows an example of the optical path of display light L. Display light L includes first light L1 and second light L2. The display unit DSP may comprise a retardation film which imparts a phase difference to display light.

The optical element 10 transmits and reflects incident light. The structure of the optical element 10 is not particularly limited as long as it transmits and reflects incident light. The optical element 10 comprises surfaces 10A and 10B. In the example shown in FIG. 1, surface 10A faces the display unit DSP. Surface 10B faces the retroreflective element 20. Surface 10B is located on a side opposite to surface 10A, and is substantially parallel to surface 10A. Surfaces 10A and 10B extend in the Z-X plane. The optical element 10 is, for example, a transflective (half) mirror. The optical element may comprise a polarizer which transmits specific polarized light or a retardation film which imparts a phase difference to incident light.

The retroreflective element 20 transmits and retroreflects incident light. The structure of the retroreflective element 20 is not particularly limited as long as it transmits and retroreflects incident light. In the example shown in FIG. 1, the retroreflective element 20 comprises surfaces 20A and 20B. In the example shown in FIG. 1, surface 20A faces the optical element 10. Surface 20B is located on a side opposite to surface 20A, and is uneven. The uneven surface 20B may reduce the specular reflection of light. An antireflective film which prevents reflection of light may be in contact with surface 20B.

The retroreflective element 20 comprises a base 21 which transmits incident light, a retroreflector 22 which retroreflects incident light, and a metal thin film (metal film) M.

Base 21 is formed of a material which transmits incident light, for example, a transparent resinous material. In the example shown in FIG. 1, base 21 comprises a surface 21A, and a surface 21B on a side opposite to surface 21A. Surface 21A corresponds to surface 20A. Surface 21B corresponds to surface 20B. A convex portion 21P is provided on surface 21B. In the example shown in FIG. 1, on surface 21B, the area other than the convex portion 21P is flat. The convex portion 21P protrudes from the flat surface of surface 21B in a direction opposite to the optical element 10 in the second direction Y. The convex portion 21P is, for example, triangular. The convex portion 21P may be formed integrally with base 21 or separately from base 21.

The retroreflector 22 comprises a structure which retroreflects incident light. In the first embodiment, the retroreflector 22 comprises a part of base 21, for example, the convex portion 21P. At least one retroreflector 22 is provided on surface 20B. For example, the retroreflector 22 retroreflects incident light on the boundary surface (surface 21B of the convex portion 21P). The retroreflector 22 may include a member capable of effectively retroreflecting incident light. The retroreflector 22 is a part of base 21. However, the retroreflector 22 may be formed by a member other than base 21. The retroreflector 22 may be formed integrally with base 21 or separately from base 21.

The metal thin film M covers surface 21B of the convex portion 21P. The thickness of the metal thin film M is substantially uniform. The metal thin film M is formed on surface 21B of the convex portion 21P by, for example, vapor deposition. The metal thin film M is formed of a material having light reflectivity, such as silver (Ag), aluminum (Al) or aluminum alloy. In the example shown in FIG. 1, the metal thin film M comprises a surface MA, and a surface MB on a side opposite to surface MA. Surface MA is in contact with surface 21B of the convex portion 21P. Surface MB corresponds to surface 20B. Surface treatment may be applied to the metal thin film M to prevent corrosion. Alternatively, the metal thin film M may be coated with an inorganic material such as silicon nitride (SiN). Surface MB of the metal thin film M may be covered with a resinous overcoat layer. The light transmittance of the metal thin film M is substantially zero. The light made incident on surface MA of the metal thin film M hardly reaches surface MB on the opposite side. As the metal thin film M is provided on surface 21B of the retroreflector 22, the retroreflector 22 is capable of effectively retroreflecting incident light. The metal thin film M may be covered with base 21.

The retroreflective element 20 comprises a transmissive portion TR which transmits incident light. The transmissive portion TR corresponds to base 21. In the example shown in FIG. 1, the transmissive portion TR is located between two adjacent retroreflectors 22. The transmissive portion TR transmits incident light from surface 20A (21A) to surface 20B (21B). The surfaces of the transmissive portion TR preferably do not scatter or refract incident light. Therefore, for example, surfaces 20A (21A) and 20B (21B) of the transmissive portion TR are flat. Surfaces 21A (20A) and 21B (20B) of the transmissive portion TR should be at least substantially flat.

As an example of the behavior of the display light emitted from the display unit DSP, the optical path of display light L is explained. The example is explained, using a transmissive portion TR1 of a plurality of transmissive portions TR between first and second retroreflectors 22N1 and 22N2 of a plurality of retroreflectors 22. The first retroreflector 22N1 is distance DS1 away from the display unit DSP. The second retroreflector 22N2 is distance DS2 away from the display unit DSP. Distance DS2 is greater than distance DS1. Display image I1 is equivalent to the real image of display image I0, and is formed at a position where display image I1 and display image I0 are plane-symmetrical with respect to the optical element 10. With respect to the retroreflectors 22 other than the first and second retroreflectors 22N1 and 22N2, the behavior of display light is the same as that of the first and second retroreflectors 22N1 and 22N2.

The first light L1 for displaying display image I0 is emitted from the display unit DSP, enters the optical element 10 and passes through the optical element 10. Subsequently, the first light L1 enters base 21 of the retroreflective element 20 and enters the second retroreflector 22N2. The first light L1 is retroreflected on the second retroreflector 22N2. After the retroreflection, the first light L1 is referred to as the second light L2. The second light L2 passes through base 21, enters surface 10B of the optical element 10 and is reflected on surface 10B. The second light L2 reflected on surface 10B enters the retroreflective element 20. Subsequently, the second light L2 passes through the transmissive portion TR1. Thus, display image I1 is formed.

At this time, the resolution of display image I1 is affected by the retroreflective property of the retroreflective element 20. The retroreflective property is indicated by the angle of the reflection direction of the second light relative to the incident direction of the first light. For example, when the second light L2 is reflected in substantially the same direction as the first light L1, the retroreflective property is good. For example, when the retroreflective property is poor, and further when the optical path from the position at which the second light L2 is retroreflected to the forming position is long, the actual forming position may be excessively far from the target forming position. When the structure of the display device 1 shown in FIG. 1 is employed, the optical path of display light L can be short. For example, at least the optical path of the second light L2 can be short by adjusting the distance between the optical element 10 and the retroreflective element 20. Thus, the optical path from the position at which the second light L2 is reflected to the forming position can be short.

FIG. 2 shows a structural example of the display panel PNL shown in FIG. 1. As an example of the display panel PNL, a transmissive liquid crystal display panel in an active matrix driving method is explained.

The display panel PNL comprises a first substrate SUB1, a second substrate SUB2 facing the first substrate SUB1, and a liquid crystal layer LQ held between the first substrate SUB1 and the second substrate SUB2. The first substrate SUB1 is attached to the second substrate SUB2 such that a predetermined cell gap is defined between them. The display panel PNL comprises a display area DA which displays an image. The display area DA comprises a plurality of subpixels PX provided in matrix.

As the subpixels PX, the display area DA comprises, for example, red pixels PXR corresponding to red, green pixels PXG corresponding green, and blue pixels PXB corresponding to blue. The display area DA may further comprise subpixels corresponding to a color different from red, green and blue (for example, white pixels corresponding to white). The pixels for realizing color display include these subpixels PX corresponding to different colors. In other words, each pixel is the minimum unit to constitute a color image. In the example shown in FIG. 2, the pixels include red pixels PXR, green pixels PXG and blue pixels PXB.

Each red pixel PXR comprises a red color filter and is configured to mainly transmit red light of the white light emitted from a light source device. Each green pixel PXG comprises a green color filter and is configured to mainly transmit green light of the white light emitted from a light source device. Each blue pixel PXB comprises a blue color filter and is configured to mainly transmit blue light of the white light emitted from a light source device. Although not explained in detail, each color filter may be formed in either the first substrate SUB1 or the second substrate SUB2.

The first substrate SUB1 comprises a plurality of gate lines G extending in the third direction Z, and a plurality of source lines S extending in the second direction Y and intersecting the gate lines G. The gate lines G are extended to the outside of the display area DA and are connected to a gate driver GD. The source lines S are extended to the outside of the display area DA and are connected to a source driver SD. The gate driver GD and the source driver SD are connected to a controller CNT. The controller CNT generates a control signal based on a video signal, and controls the gate driver GD and the source driver SD.

Each subpixel PX comprises a switching element SW, a pixel electrode PE, a common electrode CE, etc. The switching element SW is electrically connected to the gate line G and the source line S. The switching element SW is formed by, for example, a thin-film transistor. The pixel electrode PE is electrically connected to the switching element SW. The common electrode CE faces a plurality of pixel electrodes PE.

Here, the explanation of the detailed structure of the display panel PNL is omitted. In a display mode using a longitudinal electric field along the normal of the main surfaces of the substrates or a display mode using an electric field inclined at a tilt with respect to the normal of the main surfaces of the substrates, the first substrate SUB1 comprises the pixel electrodes PE, and the second substrate SUB2 comprises the common electrode CE. In a display mode using a lateral electric field along the main surfaces of the substrates, the first substrate SUB1 comprises both the pixel electrodes PE and the common electrode CE. Further, the display panel PNL may comprise a structure corresponding to a display mode appropriately using a combination of the above longitudinal electric field, lateral electric field and inclined electric field. In the example shown in FIG. 2, the main surfaces of the substrates are equivalent to the plane defined by the second direction Y and the third direction Z. The normal direction of the main surfaces of the substrates is equivalent to a direction parallel to the first direction X.

FIG. 3 is a cross-sectional view showing a structural example of the display panel PNL shown in FIG. 2.

Here, this specification briefly explains a cross-sectional structure of the display panel PNL to which a fringe field switching (FFS) mode, which is one of the display modes using a lateral electric field, is applied.

The first substrate SUB1 comprises a first insulating substrate 100, a first insulating film 110, a common electrode CE, a second insulating film 120, pixel electrodes PE1 to PE3, a first alignment film AL1, etc. The common electrode CE extends over a red pixel PXR, a green pixel PXG and a blue pixel PXB. Pixel electrode PE1 of the red pixel PXR, pixel electrode PE2 of the green pixel PXG and pixel electrode PE3 of the blue pixel PXB face the common electrode CE, and comprise slits SLA. In the example shown in FIG. 3, the common electrode CE is located between the first insulating film 110 and the second insulating film 120, and pixel electrodes PE1 to PE3 are located between the second insulating film 120 and the first alignment film AL1. Pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 comprises a second insulating substrate 200, a light-shielding layer BM, color filters CFR, CFG and CFB, an overcoat layer OC, a second alignment film AL2, etc. Color filters CFR, CFG and CFB face pixel electrodes PE1 to PE3, respectively, across the intervening liquid crystal layer LQ. Color filter CFR is a red color filter. Color filter CFG is a green color filter. Color filter CFB is a blue color filter. In the example shown in FIG. 3, color filters CFR, CFG and CFB are formed in the second substrate SUB2. However, they may be formed in the first substrate SUB1.

The liquid crystal layer LQ is encapsulated between the first alignment film AL1 and the second alignment film AL2. A light source device LS faces the first substrate SUB1. Various forms are applicable as the light source device LS. Here, the explanation of the detailed structure thereof is omitted.

A first optical element OD1 including a first polarizer PL1 is provided on the external surface of the first insulating substrate 100. A second optical element OD2 including a second polarizer PL2 is provided on the external surface of the second insulating substrate 200. For example, the first absorption axis of the first polarizer PL1 is perpendicular to the second absorption axis of the second polarizer PL2.

The pixels each including a red pixel PXR, a green pixel PXG and a blue pixel PXB are arranged with pitch P1.

Figure 4:
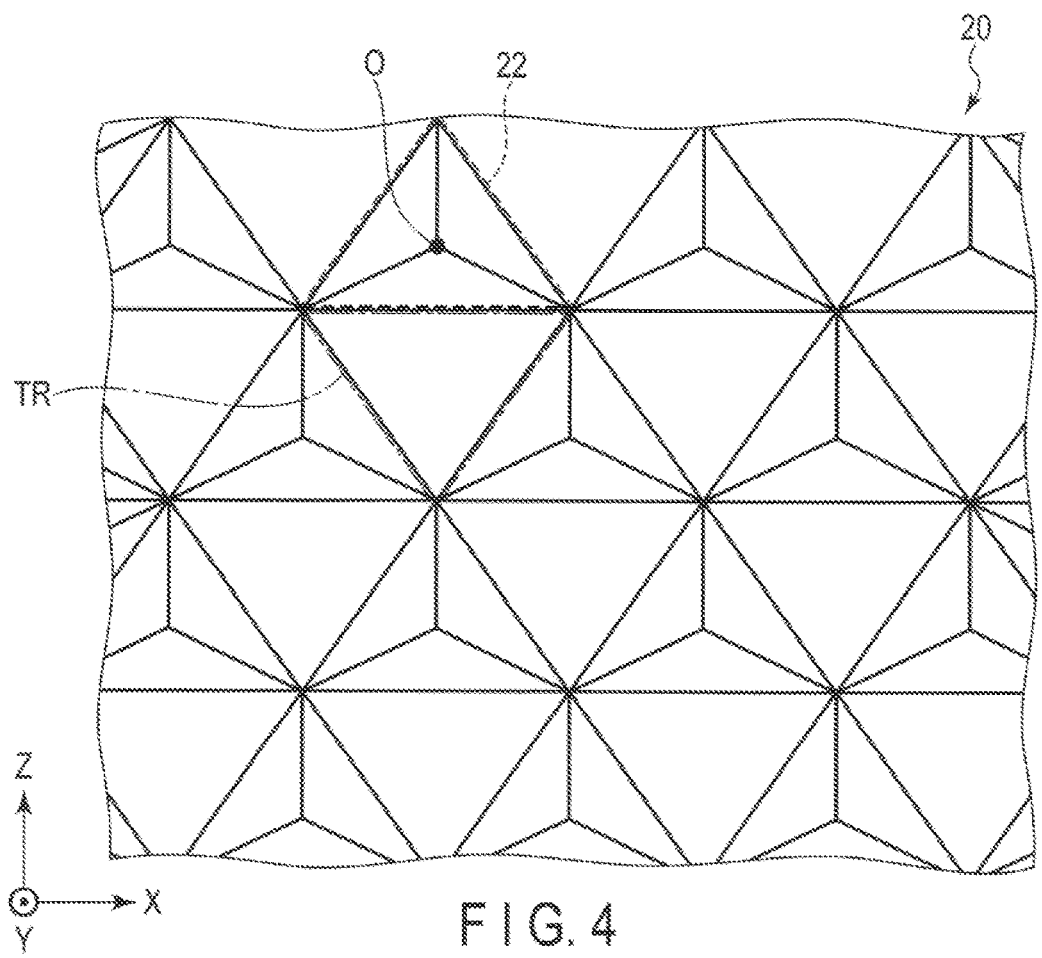
FIG. 4 is a plan view showing a structural example of the retroreflective element shown in FIG. 1.

FIG. 4 is a plan view showing a structural example of the retroreflective element 20 shown in FIG. 1. FIG. 4 shows an example of the retroreflective element 20 when it is observed in the second direction Y. A plan view is defined as a view when the Z-X plane is observed in the second direction Y.

As seen in plan view, each retroreflector 22 and each transmissive portion TR are, for example, triangular. The area of each retroreflector 22 is equal to that of each transmissive portion TR. The center O of each retroreflector 22 protrudes to the front side of the plane of paper. In the example shown in FIG. 4, in the retroreflective element 20, the retroreflectors 22 and the transmissive portions TR are alternately arranged. For example, the retroreflectors 22 and the transmissive portions TR are alternately arranged in the first direction X and are alternately arranged in the third direction Z. For example, in the first direction X and the third direction Z, the retroreflector 22 and transmissive portion TR adjacent to each other are provided such that their shapes are reversed at 180 degrees with respect to each other. In this example, the retroreflectors 22 and the transmissive portions TR are alternately arranged. However, they may not be alternately arranged. In plan view, the proportions of the retroreflectors 22 and the transmissive portions TR may not be equal to each other. The area of the retroreflectors 22 may be either greater or less than that of the transmissive portions TR. In this example, each retroreflector 22 and each transmissive portion TR is triangular as seen in plan view. However, they may have a shape different from a triangle.

Figure 5:
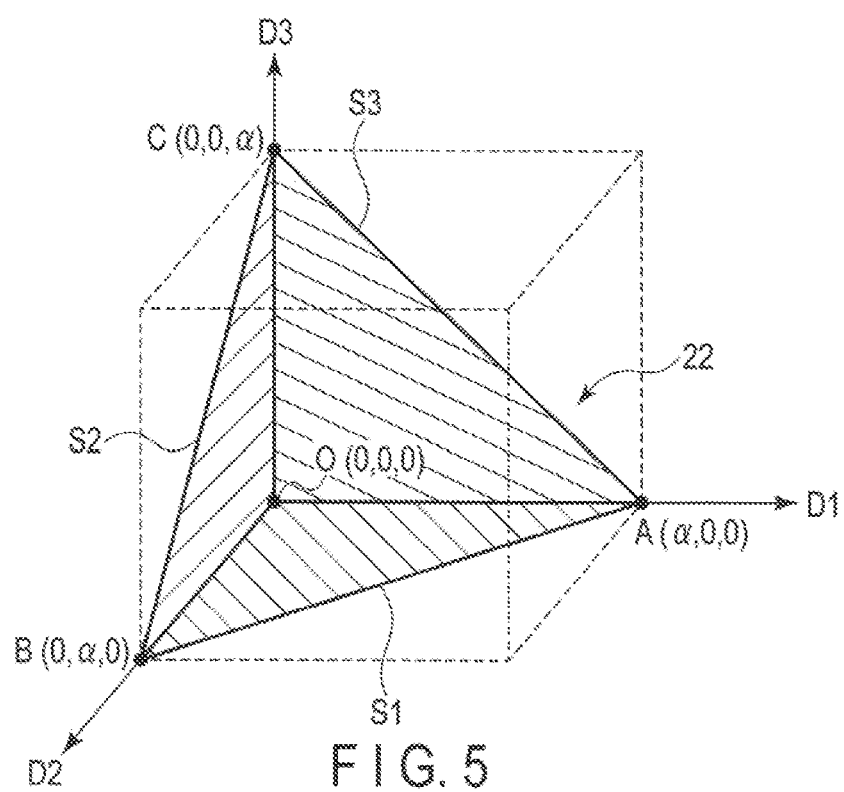
FIG. 5 is a perspective view showing a structural example of the retroreflector shown in FIG. 4.

FIG. 5 is a perspective view showing a structural example of each retroreflector 22 shown in FIG. 4. FIG. 5 shows a Cartesian coordinate system comprising a first axis D1, a second axis D2 and a third axis D3. The first axis D1, the second axis D2 and the third axis D3 are perpendicular to one another. The shape of each retroreflector 22 is explained, using the Cartesian coordinate system. In the Cartesian coordinate system, the center O of each retroreflector 22 shown in FIG. 4 is located at the origin (0, 0, 0).

For example, each retroreflector 22 is formed into a triangular pyramid. Each retroreflector 22 includes reflective surfaces S1, S2 and S3. For example, reflective surfaces S1, S2 and S3 constitute surface 21B of the retroreflector 22. Reflective surfaces S1 to S3 have the same shape. Each of reflective surfaces S1 to S3 is formed into an isosceles right triangle. Reflective surfaces S1 to S3 are perpendicular to one another. Each retroreflector 22 comprising reflective surfaces S1 to S3 having the above shape is called a corner cube, a corner reflector, etc.

When the coordinates of point A on the first axis D1 are $(\alpha, 0, 0)$, and the coordinates of point B on the second axis D2 are $(0, \alpha, 0)$, and the coordinates of point C on the third axis D3 are $(0, 0, \alpha)$, reflective surface S1 is formed in the D1-D2 plane and is defined by the origin O and points A and B. Reflective surface S2 is formed in the D2-D3 plane and is defined by the origin O and points B and C. Reflective surface S3 is formed in the D1-D3 plane and is defined by the origin O and points A and C. Base 21 or a member other than base 21 may be located in the space surrounded by the three reflective surfaces S1 to S3. The space surrounded by the three reflective surfaces S1 to S3 may be an air layer. Incident surface IP is defined by the three points A, B and C. In each retroreflector 22, retroreflection is realized by reflecting incident light on the three reflective surfaces S1 to S3. The shape of each retroreflector 22 is not limited to the example shown in FIG. 5. For example, retroreflectance is reduced near the three points A, B and C. Therefore, each retroreflector 22 may be shaped such that the vicinity of points A, B and C is cut. Each retroreflector 22 may have a shape different from a triangular pyramid as long as it is capable of retroreflecting incident light.

In the present embodiment, the retroreflective element 20 is provided substantially parallel to the optical element 10. The retroreflective element 20 comprises a plurality of retroreflectors 22, and a transmissive portion TR between two adjacent retroreflectors 22. The optical element 10 and the retroreflective element 20 emit the incident display light from the display unit DSP in the direction for forming an image. The optical path of display light L can be short by adjusting the distance between the optical element 10 and the retroreflective element 20. Thus, it is possible to provide the display device 1 capable of preventing the reduction of the resolution of the display image formed in air.

Now, this specification explains the display device according to modification examples and a display device according to another embodiment. In the modification examples and embodiment explained below, the same portions as the above first embodiment are denoted by like reference numbers, detailed description thereof being omitted or simplified. Portions different from those of the first embodiment are mainly explained in detail.

FIG. 6 shows a structural example of the display device 1 according to modification example 1, and the optical path of display light. The display device 1 of modification example 1 is different from the display device 1 shown in FIG. 1 in respect that the optical element 10 comprises a plurality of layers.

The optical element 10 comprises a first layer 11 and a second layer 12. In the optical element 10, the second layer 12 is located on the first layer 11 (for example, on the surface 10B side). In modification example 1, the first layer 11 is a polarizing element, and the second layer 12 is a retardation film.

The polarizing element is a reflective polarizer comprising a transmission axis which transmits first linearly polarized light and reflecting second linearly polarized light perpendicular to the transmission axis. For example, the first linearly polarized light is a P-wave parallel to the incident surface, and the second linearly polarized light is an S-wave perpendicular to the incident surface. This polarizing element is formed by, for example, a wire-grid polarizing filter, a reflective polarizing film to which a brightness enhancement film is applied, or a multi-layer body in which the reflective polarizing film and an absorptive polarizer are stacked. The absorptive polarizer is a polarizer transmitting linearly polarized light parallel to the transmission axis and absorbing linearly polarized light orthogonal to the transmission axis. For example, the degree of polarization of the absorptive polarizer is greater than that of the reflective polarizer. When the polarizing element is formed by the above multi-layer body, the absorptive polarizer is provided on the reflective polarizing film (for example, on the surface 10B side) and comprises a transmission axis parallel to the transmission axis of the reflective polarizing film.

The retardation film imparts a phase difference to transmitted light. For example, the retardation film is a λ/4 plate which imparts a phase difference of approximately λ/4 to transmitted light. Here, λ is the wavelength of transmitted light. The retardation film may be a stacked layer body of a plurality of retardation films having different phase differences or wavelength dispersibilities. For example, to reduce the wavelength dependency, the retardation film may be structured by combining a λ/2 plate and a λ/4 plate. Although details are omitted here, the retardation film RA is provided such that its slow axis intersects the polarization plane of linearly polarized light at 45 degrees.

As an example of the behavior of the display light emitted from the display unit DSP, the optical path of display light L is explained. The example is explained, using the transmissive portion TR1 of a plurality of transmissive portions TR between the first and second retroreflectors 22N1 and 22N2 of a plurality of retroreflectors 22. With respect to the retroreflectors 22 other than the first and second retroreflectors 22N1 and 22N2, the behavior of display light is the same as that of the first and second retroreflectors 22N1 and 22N2. The display light is, for example, the first linearly polarized light immediately after the display light is emitted from the display panel PNL.

The first light L1 for displaying display image I0 is emitted from the display unit DSP, enters the first layer 11 of the optical element 10 and passes through the first layer 11. Subsequently, the first light L1 which is the first linearly polarized light enters the second layer 12. A phase difference is imparted in the second layer 12. Thus, the first light L1 is converted into first circularly polarized light. The path of the first circularly polarized light is drawn so as to rotate clockwise when it is observed in a direction facing the direction of travel of light. The first light L1 which is the first circularly polarized light enters base 21 of the retroreflective element 20 via the optical element 10 and enters the second retroreflector 22N2. The first light L1 is retroreflected on the second retroreflector 22N2. After the retroreflection, the first light L1 is referred to as the second light L2. The second light L2 which is the first circularly polarized light enters the second layer 12 of the optical element 10. A phase difference is imparted in the second layer 12. Thus, the second light L2 is converted into the second linearly polarized light. The second light L2 which is the second linearly polarized light enters the first layer 11 and is reflected on the first layer 11. In the second layer 12, a phase difference is imparted to the second light L2 reflected on the first layer 11. Thus, the second light L2 is converted into second circularly polarized light. The second circularly polarized light is circularly polarized light rotating in a direction opposite to that of the first circularly polarized light. The second light L2 which is the second circularly polarized light enters base 21 of the retroreflective element 20. Subsequently, the second light L2 passes through the transmissive portion TR1. Thus, display image I1 is formed. An effect similar to that of the first embodiment is obtained from modification example 1. In addition, the display light emitted from the display unit DSP can be effectively used.

FIG. 7 shows a structural example of the display device 1 according to modification example 2. The display device 1 of modification example 2 is different from the display device 1 shown in FIG. 1 in terms of the structure of the retroreflective element 20.

The retroreflective element 20 comprises a base 23 which transmits incident light, the retroreflectors 22 and the metal thin films M. An antireflective film which prevents reflection of light may be in contact with surface 20B of the retroreflective element 20.

Base 23 is formed of a material which transmits incident light, for example, a transparent resinous material. Base 23 may be formed of the same material as base 21. In the example shown in FIG. 7, base 23 comprises a surface 23A, and a surface 23B on a side opposite to surface 23A. Surface 23A corresponds to surface 20A. Surface 23B corresponds to surface 20B. Concave portions 23D are provided on surface 23A. In the example shown in FIG. 7, on surface 23A, the area other than the concave portions 23D is flat. The concave portions 23D are concave in a direction opposite to the optical element 10 in comparison with the flat surface of surface 23A in the second direction Y. For example, each concave portion 23D is concave like a triangle.

In modification example 2, the retroreflectors 22 comprise a part of base 23, for example, the concave portions 23D. At least one retroreflector 22 is provided on surface 23A. Each retroreflector 22 is capable of retroreflecting incident light on the boundary surface (surface 23A of the concave portions 23D). Each retroreflector 22 may include a member capable of effectively retroreflecting incident light. The retroreflectors 22 are a part of base 23. However, the retroreflectors 22 may be formed by a member other than base 23.

The metal thin films M cover surface 23A of the concave portions 23D. In the example shown in FIG. 7, surfaces MB of the metal thin films M are in contact with surface 23A of the concave portions 23D. An air layer is formed on the surface MA side of each metal thin film M. In modification example 2, the light made incident on each retroreflector 22 is retroreflected on surface MA of the metal thin film M.

Each transmissive portion TR corresponds to base 23. Surfaces 23A (20A) and 23B (20B) of each transmissive portion TR are flat. Surfaces 23A (20A) and 23B (20B) of each transmissive portion TR should be at least substantially flat.

An effect similar to that of the above embodiment is obtained from modification example 2.

FIG. 8 shows a structural example of the display device 1 according to modification example 3. The display device 1 of modification example 3 is different from the display device 1 shown in FIG. 7 in terms of the structure of the retroreflective element 20.

The retroreflective element 20 comprises base 21, the retroreflectors 22, base 23 and the metal thin films M. Base 23 is located on the surface 21B side of base 21. Each retroreflector 22 is provided between base 21 and base 23. The metal thin films M cover surface 21B of the convex portions 21P of base 21. Each transmissive portion TR corresponds to base 21 and base 23. In the example shown in FIG. 8, in each transmissive portion TR, surface 21B of base 21 is in contact with surface 23A of base 23. Surfaces 21A (20A) and 23B (20B) of each transmissive portion TR are flat. An antireflective film which prevents reflection of light may be in contact with surface 20B. Surfaces 21A (20A) and 23B (20B) of each transmissive portion TR should be at least substantially flat.

An effect similar to that of the above embodiment is obtained from modification example 3.

FIG. 9 shows a structural example of the display device 1 according to modification example 4. The display device 1 of modification example 4 is different from the display device 1 shown in FIG. 8 in terms of the structure of the retroreflective element 20.

The retroreflective element 20 comprises base 21, the retroreflectors 22, base 23 and the metal thin films M. Base 23 is located on the surface 21B side of base 21. Each retroreflector 22 is provided between base 21 and base 23. Each retroreflector 22 is inclined at angle β1 with respect to the flat surface of surface 21B (20B). For example, each retroreflector 22 is inclined such that the retroreflective surface faces the display unit DSP side.

An effect similar to that of the above embodiment is obtained from modification example 4. In addition, the display light emitted from the display unit DSP can effectively enter each retroreflector 22. In modification example 4, the retroreflective element 20 comprises bases 21 and 23. However, at least one of bases 21 and 23 should be provided.

FIG. 10 shows a structural example of the display device 1 according to modification example 5. The display device 1 of modification example 5 is different from the display device 1 shown in FIG. 1 in terms of the structure of the retroreflective element 20.

The retroreflective element 20 comprises base 21, the retroreflectors 22 and the metal thin films M.

Base 21 comprises surface 21A and surface 21B on a side opposite to surface 21A. In modification example 5, the spherical retroreflectors 22 are provided on surface 21B. In the example shown in FIG. 10, on surface 21B, the area other than the retroreflectors 22 is flat.

Each retroreflector 22 comprises a spherical member BS. Each retroreflector 22 is buried in surface 21B. A plurality of retroreflectors 22 are provided on surface 21B. Each spherical member BS is formed of, for example, a transparent material. For example, each spherical member BS is a glass bead. Each spherical member BS comprises a surface BA, and a surface BB other than surface BA. Each surface BA is a portion which is in contact with base 21.

The metal thin films M cover surfaces BB of the spherical members BS. In the example shown in FIG. 10, surfaces MB of the metal thin films M are in contact with surfaces BB of the spherical members BS. In modification example 5, the light made incident on each retroreflector 22 is retroreflected on surface MA of the metal thin film M.

Each transmissive portion TR corresponds to base 21. Surfaces 21A (20A) and 21B (20B) of each transmissive portion TR are flat. An antireflective film which prevents reflection of light may be in contact with surface 20B. Surfaces 21A (20A) and 21B (20B) of each transmissive portion TR should be at least substantially flat.

An effect similar to that of the above embodiment is obtained from modification example 5.

Figure 11:
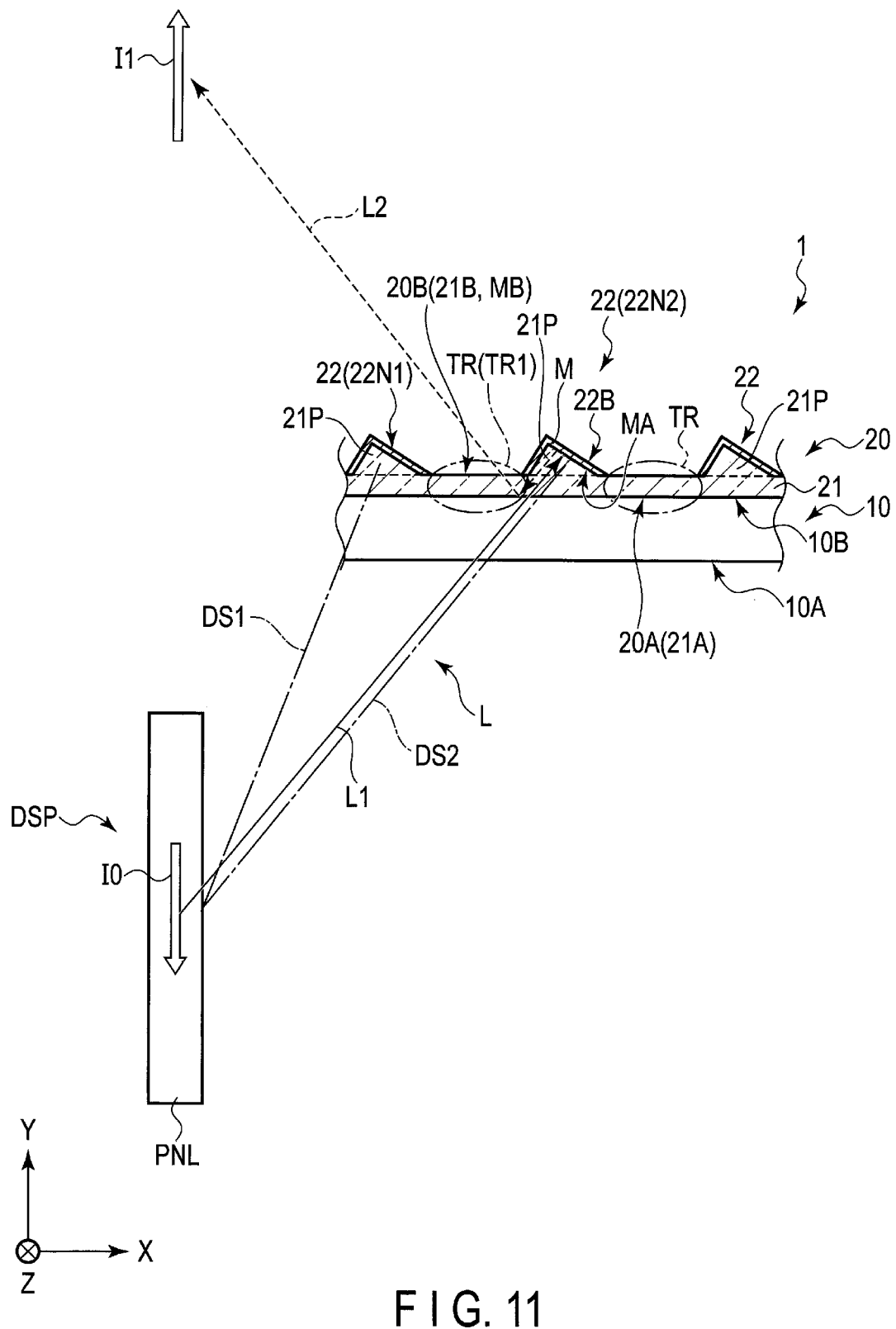
FIG. 11 shows a structural example of the display device according to modification example 6.

FIG. 11 shows a structural example of the display device 1 according to modification example 6. The display device 1 of modification example 6 is different from the above display device 1 in respect that the optical element 10 is in contact with the retroreflective element 20.

In the example shown in FIG. 11, surface 20A (21A) of the retroreflective element 20 is in contact with surface 10B of the optical element 10. In modification example 6, no member is interposed between the optical element 10 and the retroreflective element 20.

An effect similar to that of the above embodiment is obtained from modification example 6. In addition, the optical path of display light L can be short.

Figure 12:
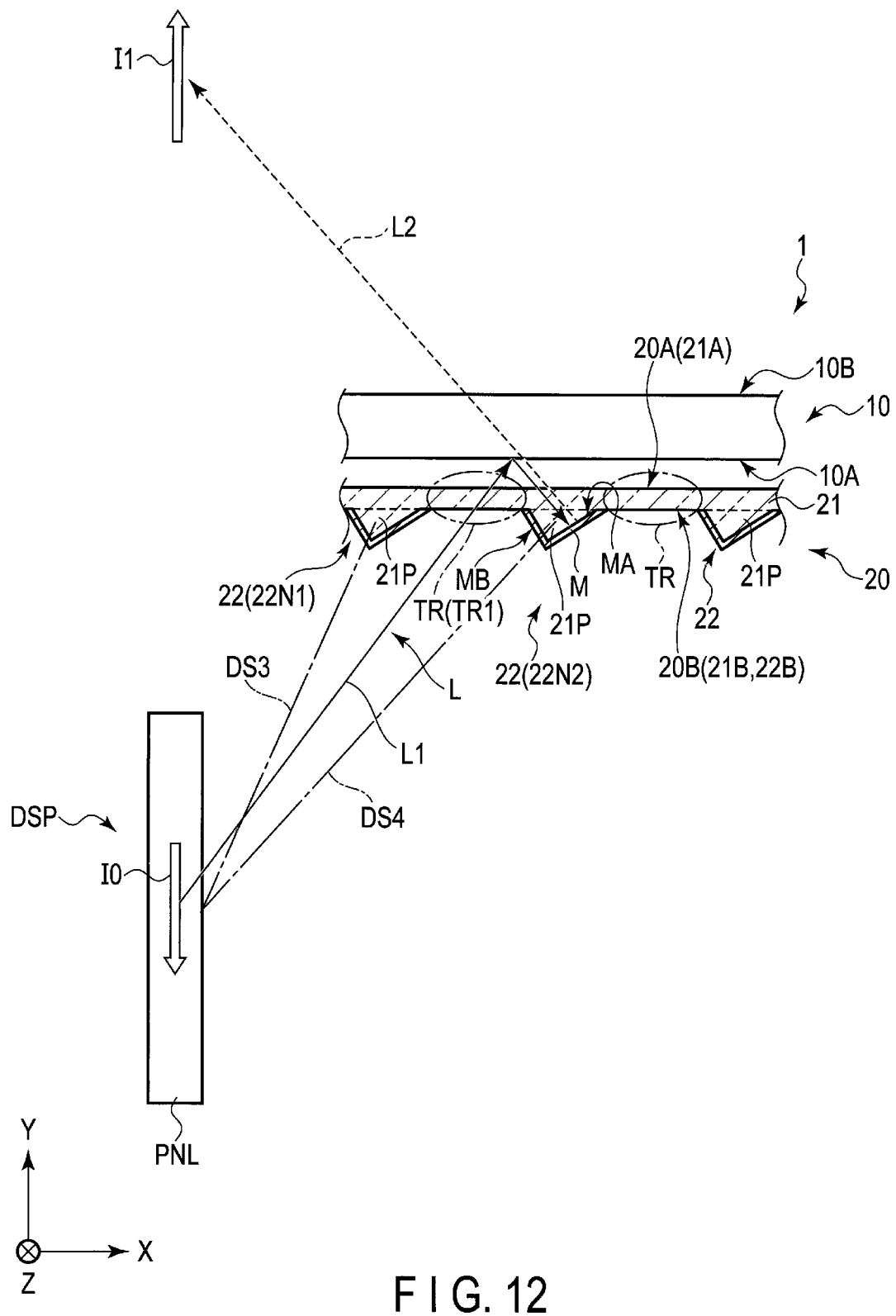
FIG. 12 shows a structural example of a display device according to a second embodiment, and the optical path of display light.

FIG. 12 shows a structural example of a display device 1 according to a second embodiment, and the optical path of display light. The display device 1 of the second embodiment is different from the above display device 1 in terms of the positions of an optical element 10 and a retroreflective element 20. The retroreflective element 20 of the second embodiment and the retroreflective element 20 of the first embodiment are symmetrical with respect to the optical element 10.

A display unit DSP faces the retroreflective element 20 in a first direction X. The retroreflective element 20 faces the optical element 10 in a second direction Y. In the example shown in FIG. 12, surface 20B of the retroreflective element 20 faces the display unit DSP. In the second direction Y, each convex portion 21P of surface 20B protrudes in a direction opposite to the optical element 10, in other words, in the direction of the display unit DSP. Surface 20A faces surface 10A of the optical element 10.

As an example of the behavior of the display light emitted from the display unit DSP, the optical path of display light L is explained. The example is explained, using a transmissive portion TR1 of a plurality of transmissive portions TR between first and second retroreflectors 22N1 and 22N2 of a plurality of retroreflectors 22. The first retroreflector 22N1 is distance DS3 away from the display unit DSP. The second retroreflector 22N2 is distance DS4 away from the display unit DSP. Distance DS4 is greater than distance DS3. With respect to the retroreflectors 22 other than the first and second retroreflectors 22N1 and 22N2, the behavior of display light is the same as that of the first and second retroreflectors 22N1 and 22N2.

First light L1 for displaying display image I0 is emitted from the display unit DSP, enters the retroreflective element 20 and passes through the transmissive portion TR1. Subsequently, the first light L1 enters surface 10A of the optical element 10 and is reflected on surface 10A. The first light L1 reflected on surface 10A enters the second retroreflector 22N2. The first light L1 is retroreflected on the second retroreflector 22N2. After the retroreflection, the first light L1 is referred to as second light L2. The second light L2 passes through a base 21 and enters the optical element 10. Subsequently, the second light L2 passes through the optical element 10. Thus, display image I1 is formed.

An effect similar to that of the first embodiment is obtained from the second embodiment.

Figure 13:
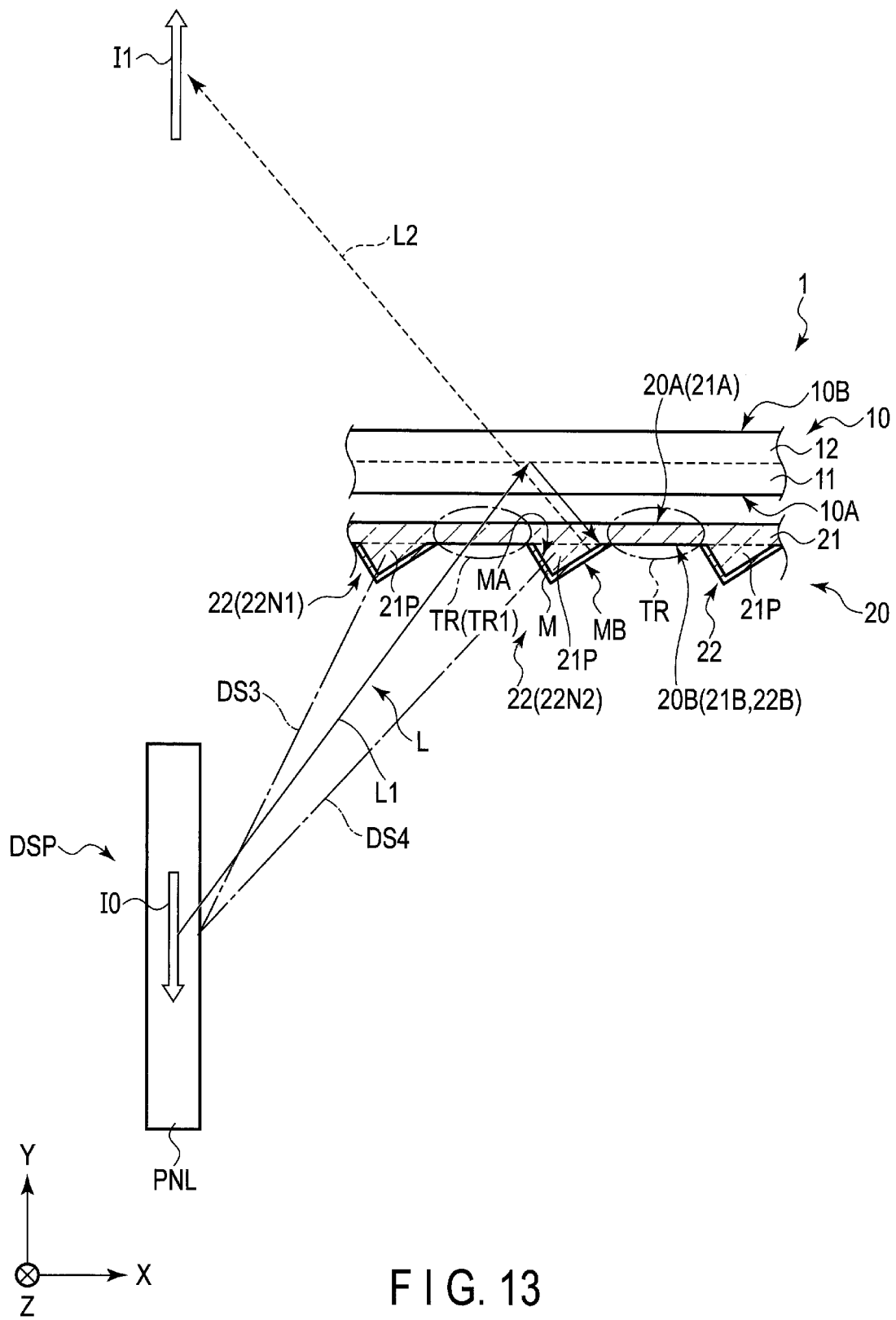
FIG. 13 shows a structural example of the display device according to modification example 7, and the optical path of display light.

FIG. 13 shows a structural example of the display device 1 according to modification example 7, and the optical path of display light. The display device 1 of modification example 7 is different from the display device 1 shown in FIG. 12 in respect that the optical element 10 comprises a plurality of layers.

In modification example 7, for example, a first layer 11 is a retardation film, and a second layer 12 is a polarizing element.

As an example of the behavior of the display light emitted from the display unit DSP, the optical path of display light L is explained. The example is explained, using the transmissive portion TR1 of a plurality of transmissive portions TR between the first and second retroreflectors 22N1 and 22N2 of a plurality of retroreflectors 22. With respect to the retroreflectors 22 other than the first and second retroreflectors 22N1 and 22N2, the behavior of display light is the same as that of the first and second retroreflectors 22N1 and 22N2. The display light is, for example, first circularly polarized light immediately after the display light is emitted from a display panel PNL. The display unit DSP may comprise a retardation film, for example, a λ/4 plate, on the retroreflective element 20 side. In this case, the display light is first linearly polarized light immediately after the display light is emitted from the display panel PNL.

The first light L1 for displaying display image I0 is emitted from the display unit DSP, enters the transmissive portion TR1 of the retroreflective element 20 and passes through the transmissive portion TR1. Subsequently, the first light L1 which is the first circularly polarized light enters the first layer 11 of the optical element 10. A phase difference is imparted in the first layer 11. Thus, the first light L1 is converted into second linearly polarized light. The first light L1 which is the second linearly polarized light enters the second layer 12 and is reflected on the second layer 12. In the first layer 11, a phase difference is imparted to the first light L1 which is the second linearly polarized light. Thus, the first light L1 is converted into second circularly polarized light. The first light L1 which is the second circularly polarized light enters base 21 of the retroreflective element 20 and enters the second retroreflector 22N2. The first light L1 is retroreflected on the second retroreflector 22N2. After the retroreflection, the first light L1 is referred to as the second light L2. The second light L2 which is the second circularly polarized light passes through base 21 and enters the first layer 11 of the optical element 10. A phase difference is imparted in the first layer 11. Thus, the second light L2 is converted into the first linearly polarized light. Subsequently, the second light L2 which is the first linearly polarized light passes through the second layer 11. Thus, display image I1 is formed.

An effect similar to that of the above embodiment is obtained from the present modification example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display unit which emits display light;
an optical element which comprises a first surface on the display unit side, and a second surface on a side opposite to the first surface, and transmits and reflects incident light; and
a retroreflective element provided on the first surface side or the second surface side, wherein
the retroreflective element comprises a base, and first and second retroreflectors provided on a side opposite to the optical element with respect to the base and retroreflecting light made incident through the optical element,
the base comprises a transmissive portion located between the first retroreflector and the second retroreflector, and
the first retroreflector and the second retroreflector are shaped like a triangular pyramid or are spherical.

2. The display device of claim 1, wherein
the retroreflective element is provided on the second surface side,
the first retroreflector is a first distance away from the display unit,
the second reflector is a second distance away from the display unit, the second distance being greater than the first distance, and
the transmissive portion transmits light reflected on the optical element after retroreflection on the second retroreflector.

3. The display device of claim 2, wherein
the first retroreflector comprises a first convex portion protruding in a direction opposite to the optical element, and
the second retroreflector comprises a second convex portion protruding in the direction opposite to the optical element.

4. The display device of claim 3, wherein
a third surface of the first convex portion and a fourth surface of the second convex portion are covered with a metal film.

5. The display device of claim 3, further comprising:
a retardation layer which imparts a phase difference to transmitted light; and
a polarizing layer which comprises a transmission axis transmitting first linearly polarized light and reflects second linearly polarized light intersecting the transmission axis, wherein
the retardation layer is located between the polarizing layer and the retroreflective element.

6. The display device of claim 3, wherein
the third surface and the fourth surface are curved.

7. The display device of claim 2, wherein
the first retroreflector comprises a first concave portion which is concave in a direction opposite to the optical element, and
the second retroreflector comprises a second concave portion which is concave in the direction opposite to the optical element.

8. The display device of claim 7, wherein
a third surface of the first concave portion and a fourth surface of the second concave portion are covered with a metal film.

9. The display device of claim 1, wherein
the retroreflective element is provided on the first surface side,
the first retroreflector is a first distance away from the display unit,
the second retroreflector is a second distance away from the display unit, the second distance being greater than the first distance,
the transmissive portion transmits the display light, and
the optical element reflects light which passed through the transmissive portion toward the second retroreflector.

10. The display device of claim 9, wherein
the first retroreflector comprises a first convex portion protruding to the display unit side, and
the second retroreflector comprises a second convex portion protruding to the display unit side.

11. The display device of claim 10, wherein
a third surface of the first convex portion and a fourth surface of the second convex portion are covered with a metal film.

12. The display device of claim 10, further comprising:
a retardation layer which imparts a phase difference to transmitted light; and a polarizing layer which comprises a transmission axis transmitting first linearly polarized light and reflects second linearly polarized light intersecting the transmission axis, wherein the retardation layer is located between the polarizing layer and the retroreflective element.

13. The display device of claim 1, wherein the optical element comprises:
    a retardation layer which imparts a phase difference to transmitted light; and
    a polarizing layer which comprises a transmission axis transmitting first linearly polarized light and reflects second linearly polarized light intersecting the transmission axis, and
the retardation layer is located between the polarizing layer and the retroreflective element.

14. The display device of claim 1, wherein the first retroreflector and the second retroreflector are covered with a metal film.

15. The display device of claim 1, wherein the first retroreflector, the transmissive portion and the second retroreflector are triangular when they are observed in an observation direction from the retroreflective element to the optical element or from the optical element to the retroreflective element.

16. The display device of claim 15, further comprising a third retroreflector which retroreflects light made incident through the optical element, wherein
the third retroreflector is triangular when it is observed in the observation direction, and
the transmissive portion is adjacent to the first retroreflector, the second retroreflector and the third retroreflector when they are observed in the observation direction.

17. The display device of claim 1, wherein the retroreflective element is in contact with the first surface or the second surface.

18. The display device of claim 1, wherein the retroreflective element comprises the first retroreflector, the second retroreflector and the transmissive portion between a third surface and a fourth surface on a side opposite to the third surface.

19. The display device of claim 18, wherein the retroreflective element includes a first metal film provided along a shape of the first retroreflector, and a second metal film provided along a shape of the second retroreflector.

* * * * *